Patented July 30, 1935

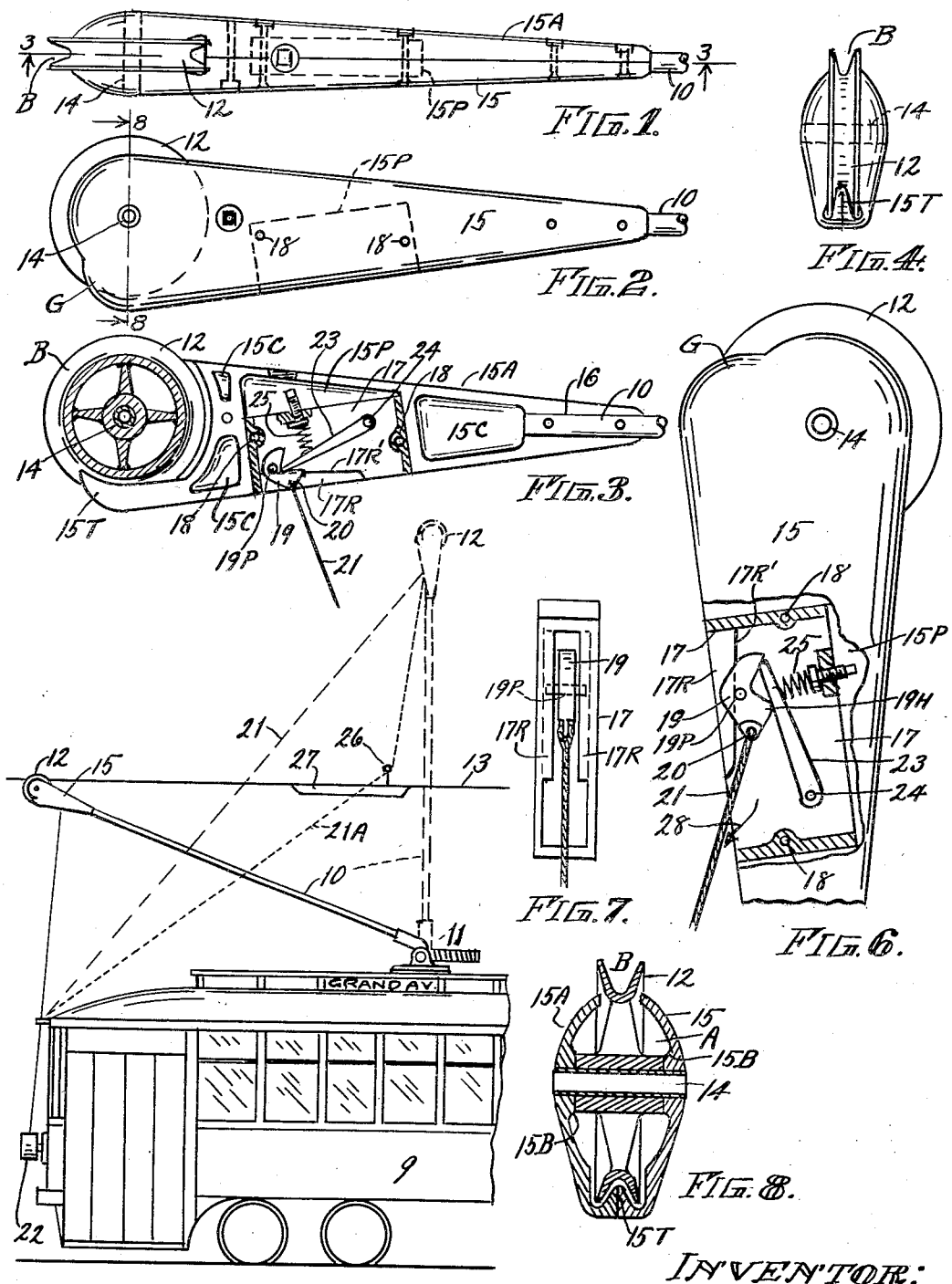

2,009,499

UNITED STATES PATENT OFFICE 2,009,499

TROLLEY WHEEL GUARD

Carl A. Kessler, St. Paul, Minn.

Application March 16, 1934, Serial No. 715,862

3 Claims. (Cl. 191—1)

My invention relates to a device attached to the free end of a trolley pole such as used on street cars, and is particularly designed for use on electric street railways having the over-head system of trolley wires.

The device embodies a hollow tapered shell or sleeve the small end of which is detachably securable to a regular trolley pole and the larger end formed with suitable bearing means for the trolley wheel which contacts with the usual feed wires. Said latter end is also formed with a vertical gap through which only the upper and rear parts of the trolley wheel are exposed for purposes hereinafter fully disclosed.

An object of this sleeve device is to provide means whereby trolley pole breakage or damage is practically eliminated, also damage to the trolley wires, span wires and trolley frogs.

In the accompanying drawing:

Fig. 1 is a top view of my trolley wheel sleeve device fixed on the free end of a street car trolley pole.

Fig. 2 is a side elevation of Fig. 1, and Fig. 3 is a longitudinal vertical elevation of one half of the device, as on line 3—3 in Fig. 1.

Fig. 4 is a left end elevation of Fig. 2.

Fig. 5 is a side elevation of the rear end of a street car on the trolley pole of which is incorporated my device in operative position.

Fig. 6 is an enlarged vertical elevation of about the left half of Fig. 3, a portion of the shell cut out to reveal the automatic retrieving cord release means, and Fig. 7 is a face view of said latter means embodied in the casing removable from the main shell.

Fig. 8 is an enlarged cross sectional detail view through the trolley wheel, as on line 8—8 in Fig. 2.

In the drawing corresponding and like parts are referred to in the following description and designated in the several views by like reference characters.

9 designates any electric street car of the kind having a trolley pole 10 pivotally mounted at 11, said part 11 designating any suitable type of rotatable holder with the usual spring actuated means causing the trolley pole to bear upwardly continuously for proper contact of the trolley wheel 12 with the trolley wire 13.

As far as I am aware the trolley wheel 12 has hitherto been rotatably mounted on a tubular shaft 14 the outer ends of which are retained in a bifurcated metal member (not shown) having a shank secured to the outer end of the trolley pole. My device comprises a main semi-hollow elongated member preferably consisting of two counterpart pieces 15—15A securely bolted together, said body member hereinafter designated as the sleeve. This sleeve is tapered, its smaller end being bored longitudinally and centrally (as at 16 in Fig. 3) to retain the rear end of the trolley pole 10 therein.

The central part of the sleeve is formed with a downwardly opening pocket 15P in which is removably fixed a certain trolley rope holding and releasing device presently to be described. The rear and widest end of the sleeve is formed rounded, exteriorly, and has a rearward and upwardly opening vertical slot which is the opening of a hollow pocket A (see Fig. 8).

The trolley wheel 12 is of the usual flanged type and the shaft 14 thereof is suitably retained in a pair of horizontally registering bearings 15B in pocket A, said wheel being of such size that only the upper and rearward perimetral parts of it are exposed through the slot, as clearly shown. 15C designates hollowed out interior parts of the sleeve merely to reduce the weight.

The rear and lower extremity of the sleeve is formed with a rearwardly directed central tongue 15T normally within the channel B of the trolley wheel and exteriorly of the trolley wheel the sleeve part opposite said tongue (on each side) forms a rounded guard G from the lower side of which the sleeve extends forwardly in a straight line. The outer areas of the entire sleeve are shaped in as rounded form as possible and indicated by shade lines.

17 is a hollow, elongated mechanism chamber adapted to be slidably inserted in the pocket 15P from below and retained firmly therein by a pair of bolts 18 passed through it and the opposite walls of the sleeve, said housing having a lower outlet concentric of pocket 15P when in operative position and the housing being entirely concealed except at said opening. In the opening of the housing and at each side of it is provided an integral rail 17R, said rails being parallel and having horizontally registering inclined faces 17R' with said rails terminating in spaced relation to the front end of the housing for insertion and outlet of a trolley rope trigger member 19 which will now be described.

The trigger member 19 is a flat piece of metal of sufficient thickness to ride freely between the adjacent faces of the rails 17R, and is of approximately L-shape. In the angle of the trigger is fixed a transverse pin 19P projecting both ways and said projections adapted to ride on the inner and angular faces of the rails. To the lower extremity or arm of said trigger is secured, as at 20, the upper end of the usual trolley-pole rope 21 which extends downwardly to a trolley rope retriever 22 well known in the art and fixed on the rear part of the car (see Fig. 5).

In normal conditions the trigger is in a position at the forward extremities of the rails 17R, within housing 17, its inner angular opening directed forwardly and engaged by the free end of a lever 23 the front end of which is fulcrumed on a transverse pin 24 in the front part of the housing. This lever is normally pressed down by any suitable yieldable means (preferably adjustable) and designated by a compression coil spring 25. This downward pressure locks the trigger in its forward position, and while in this position of the trigger the trolley rope extends therefrom directly to the reel 22 under light tension, the cord extending under normal conditions about at right angles from the trolley pole, that is, when the trolley wheel is in operative contact with the trolley wire.

26 in Fig. 5 disignates a span wire from which wire 13 is suspended. 27 designates a frog on line 13 and on which the trolley wheel is guided when the car makes a turn.

I will now describe the use of my device.

In tram car operation it is well known that for various reasons the trolley wheel sometimes becomes disengaged from the wire 13 in which event the trolley pole mounting means at 11 immediately spring the entire pole upwardly. If the car is in motion its continued movement brings the pole into more or less violent contact with span wires 26 and other obstructions, whether the motion is forward or backward, and sometimes even if the retrieving mechanism functions rapidly. Obviously such retrieving means will bring the pole downward but in doing so the pole may contact violently with span wires, trolley wires, or frogs, causing damage to either or all said parts. As an example, if the car should be in rearward motion (reverse) and the pole springs up (as to dotted line position in Fig. 5) the trolley rope may come in contact with span wire 26 as indicated by the dotted line 21A. This immediately brings the said rope close to the upright pole and in my device this rope then becomes disengaged from the pole, freeing the latter from excessive pulling action on the cord and allowing the pole to pivot freely at 11 when it subsequently contacts the span wire and damage to said parts is eliminated.

The means whereby the pole and rope are disengaged is clearly shown in Figs. 3 and 6. As the cord 21 gets nearer to parallel relation with the pole the trigger 19 is tilted until its forward inner heel 19H contacts and presses lever 23 inwardly, slidably disengaging the free end of the lever from the opposite inner surface of the trigger, the latter then becoming free rides downwardly on the rails 17 and is pulled outwardly through the enlarged forward opening of the casing 17 (see arrow 28 Fig. 6).

If there should happen to be no crosswise obstruction in the path of the trolley pole when it is pulled down the trolley retrieving cord is not released. Also, when the pole is pulled down, if it should contact the wire 13 or other obstacles with its lower side, the trolley wheel itself cannot contact the wire because of the lower guard means described, namely, the finger-like guard 15T and the adjacent rounded areas of the sleeve cause the pole to be deflected from the wire until the pole can be eased upwardly for proper contact of the trolley wheel with the wire.

It will be readily understood (though not illustrated) that those metal parts of the rear end of the sleeve nearest to the trolley wheel may be lined or insulated with non-electro-conductive material so that in case the trolley becomes loose or wobbly and has a tendency to rotate in a plane out of normal, any contact of the trolley wheel with said parts will not permit current to jump across and thus create objectionable sparking and electric flashes.

A particularly desirable feature of my sleeve is its rounded contour throughout its entire length, and consequently entire elimination of any projecting or angular parts of any kind which may contact with and break trolley wires, span wires etc. The necessary bolts or screws for connecting the counterpart sleeve parts have countersunk nuts and heads as the case may be leaving an entirely unbroken exterior surface as most clearly illustrated in Figs. 1, 2 and 4.

I claim:

1. A trolley-wheel guard and mounting device comprising an elongated, tapered metal sleeve, trolley-wheel mounting means in the larger end thereof and means at the opposite end for securing the guard to the free end of a trolley pole and in alinement therewith, said sleeve comprising two counterpart members, separable longitudinally in a vertical plane, the entire sleeve formed with rounded exterior contour, and a downwardly opening mechanism chamber intermediate the ends of the sleeve, a mechanism housing removably retained in said chamber, trolley rope holding means within said latter housing and further means therein for releasing said trolley rope automatically when the trolley rope and the pole are brought into predetermined positions relative to each other.

2. A trolley-wheel mounting and guard device comprising an elongated tapered metal member the smaller and front end of which is securable rigidly to the free end of a trolley pole and means at the wider and rear end of the member for retaining a trolley-wheel in a vertical plane with only predetermined exterior parts of said trolley wheel exposed outwardly of the member, means forward of the trolley-wheel part in said member, for releasably retaining one end of a trolley-retrieving rope, said latter means comprising a longitudinal downwardly open housing, an L-shaped trigger slidably and pivotally mounted in said opening, a spring-pressed pivoted locking lever normally engaging the trigger member with its free end, said trolley-rope secured to said trigger below the point of contact of the locking lever, said trigger adapted to be rocked to a limited extent by the retrieving rope and formed with a heel arranged to disengage the locking lever when the retrieving rope reaches a predetermined position relative to the trolley pole.

3. A trolley-wheel mounting and guard device comprising an elongated tapered metal member the smaller and front end of which is securable rigidly to the free end of a trolley pole and means at the wider and rear end of the member for retaining a trolley wheel in a vertical plane with only predetermined exterior parts of the said trolley-wheel exposed outwardly of the member, means forward of the trolley-wheel part, in said member, for releasably retaining one end of a trolley-retrieving rope, said latter means comprising a longitudinal downwardly opening housing, an L-shaped trigger slidably and pivotally mounted in said opening, a spring-pressed pivoted locking lever normally engaging the trigger member with its free end, said trolley rope secured to said trigger below the point of contact of the locking lever, said trigger adapted to be rocked to a limited extent and formed with a heel arranged to disengage the locking lever when the retrieving rope reaches a predetermined position relative to the trolley pole, and a transverse pivoting pin through said trigger, parallel rails in the mechanism housing one at each side, but said rails terminating in spaced relation to the front end of the housing to provide an outlet for the trigger when the latter is released, opposite end parts of said pin adapted to bear and ride on the inner faces of said rails.

CARL A. KESSLER.